United States Patent Office 3,535,381
Patented Oct. 20, 1970

3,535,381
UNSATURATED FLUOROALKYL AMINES AND PROCESS FOR THE PREPARATION THEREOF
Murray Hauptschein, Glenside, and Arnold Harold Fainberg and Robert Bonner Hager, King of Prussia, Pa., assignors to Pennwalt Corporation, a corporation of Pennsylvania
No Drawing. Filed May 22, 1967, Ser. No. 640,379
Int. Cl. C07c 85/02, 87/26, 87/28
U.S. Cl. 260—570.9       13 Claims

ABSTRACT OF THE DISCLOSURE

Beta-gamma unsaturated fluoroalkyl amines of the formula $R_fR'_fC=CHCH_2NZ$ and their salts of the formula

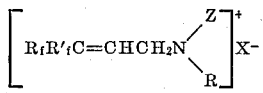

are provided, where $R_f$ and $R'_f$ are fluorine or fluoroalkyl radicals, NZ is the residue of a primary or secondary amine obtained by removal of a free amino hydrogen atom therefrom, R is hydrogen or lower alkyl, and X is an anion. The unsaturated fluoroalkyl amine is prepared by reacting a fluoroalkyl ethylene, $R_fR'_fCFCH=CH_2$, with a primary or secondary amine. The beta-gamma unsaturated amines are used as precursors in making polymeric materials for textile and leather treatment to impart oil and water-repellency thereto. The salts of the amines are cationic surfactants.

---

The invention relates to a new class of unsaturated fluoroalkyl amines and to the unsaturated fluoroalkyl ammonium salts derived from said amines.

The invention also relates to the method of preparing said amines wherein a fluoroalkyl ethylene is reacted with a primary or secondary amine to produce a novel unsaturated amine that is characterized by having beta-gamma unsaturation.

More particularly, the present invention provides unsaturated fluoroalkyl amines having the formula $$R_fR'_fC=CHCH_2NZ$$

and the salts of said amines having the formula

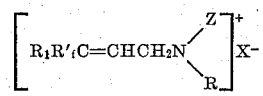

In the above formulae $R_f$ and $R'_f$ are independently selected from the group consisting of fluorine, perfluoroalkyl, perfluorochloroalkyl, perfluorohydroalkyl and perfluorochlorohydroalkyl radicals. $R_f$ and $R'_f$ taken together have a total of up to about 20 carbon atoms. There are preferably from about 6 to 14 carbon atoms in $R_f$, and $R'_f$ preferably is fluorine. A perfluoroalkyl radical, which is herein preferred, is defined as one containing only carbon and fluorine; a perfluorohydroalkyl radical is defined as one containing only fluorine, hydrogen and carbon in which the ratio of fluorine atoms to hydrogen atoms is at least 1:1; a perfluorochloroalkyl radical is one which contains only fluorine, chlorine and carbon, and the ratio of fluorine to chlorine atoms is at least 1:1; a prefluorochlorohydroalkyl radical is one containing only fluorine, chlorine, hydrogen and carbon, wherein the ratio of fluorine to chlorine is at least 1:1 and the ratio of fluorine plus chlorine to hydrogen atoms is at least 1:1; any of the foregoing radicals may be straight chain or branched chain.

NZ is the residue of a primary or secondary aliphatic or alicyclic amine having up to about 20 carbon atoms obtained by removal of a free amino hydrogen atom from said primary or secondary amine. In the preferred embodiments —NZ is represented by

where $R_1$ is selected from the group consisting of alkyl radicals and substituted alkyl radicals having from 1 to about 20 carbon atoms, preferably 1 to 15 carbon atoms, the term "alkyl radicals" including alicyclic radicals as well as straight and branched chain aliphatic radicals; the substituted alkyl radicals can be mono- or multi-substituted and the substituents are selected from the class consisting of aryl having from 6 to 10 carbon atoms, hydroxy, alkoxy having 1 to about 10 carbon atoms, and primary amino and secondary amino having up to 10 carbon atoms. $R_2$ is selected from the group consisting of hydrogen $R_fR'_fC=CHCH_2=$, and any of the group represented by $R_1$. R in the above general formula is selected from the group consisting of hydrogen and lower alkyl radicals having 1 to 6 carbon atoms. X is an anion of a salt-forming acid, for example, X is a halide ion, preferably chloride or iodide, a sulfate anion $HSO_4^-$ or $SO_4^=$, a phosphate anion, or an acetate anion.

The reaction embodied in the present invention is that of a primary or secondary amine with a fluoroalkyl ethylene and can be depicted as:

$R_fR'_fCFCH=CH_2 +\quad 2HNZ \longrightarrow$
fluoroalkyl ethylene    primary or secondary

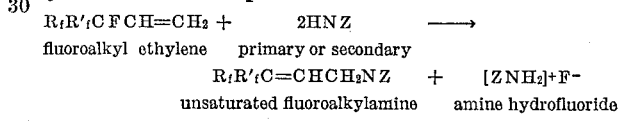

unsaturated fluoroalkylamine    amine hydrofluoride

The fluoroalkyl ethylene starting material, $$R_fR'_fCFCR=CH_2$$

is conveniently prepared by the addition reaction of a fluoroalkyl iodide with ethylene to form the corresponding fluoroalkyl ethylene iodide, in accordance with Equation $a$ below: the fluoroalkyl iodide is then dehydroiodinated by reaction with KOH to prepare the fluoroalkyl substituted ethylene, in accordance with Equation $b$ below.

(a)    $R_fR'_fCFI + CH_2=CH_2 \rightarrow R_fR'_fCFCH_2CH_2I$ (b)    $R_fR'_fCFCH_2CH_2I + KOH \rightarrow$
$$R_fR'_fCFCH=CH_2 + KI + H_2O$$

The fluoroalkyl iodides and the reaction of ethylene therewith to produce the ethylene adducts, as depicted in Reaction $a$, are well known in the art. This reaction generally is carried out employing a mole ratio of ethylene to fluoroalkyl iodide of from 1:1 to 3:1. Reaction temperatures ranging from about 25° C. to about 250° C. and pressures of from about 0.1 to 50 atmospheres may be used. If desired, a free-radical generating catalyst, including actinic radiation, e.g. ultraviolet light, may be employed in the reaction. The dehydroiodination of a fluoroalkyl ethylene iodide with KOH, as depicted in Reaction $b$, can be carried out in a solvent such as ethylene glycol or glycol ethers, or it can be conducted in the absence of solvent using powdered caustic. Suitable reaction temperatures are from about 80° C. to about 200° C.

As mentioned briefly above, the process embodied in this invention involves the reaction of said fluoroalkyl substituted ethylene with a primary or secondary amine, viz.

$R_fR'_fCFCH=CH_2 + 2HNZ \rightarrow$
$$R_fR'_fC=CHCH_2NZ + [ZNH_2]^+F^-$$

Representative of the preferred fluoroalkyl ethylenes used to prepare the unsaturated amines of the invention are the following compounds:

$$(CF_3)_2CFCH=CH_2$$

$$(CF_3)_2CF(CF_2)_mCH=CH_2$$

$m=1$ to 12

$$CF_3(CF_2)_mCH=CH_2$$

$m=0$ to 14

$$CF_3CF(CF_2)_mCH=CH_2$$
$$\quad\quad | \quad\quad\quad\quad\quad\quad$$
$$\quad\quad CClF_2$$

$m=0$ to 12

$$CHF_2(CF_2)_mCH=CH_2$$

$m=0$ to 14

The fluoroalkyl ethylene is reacted with a primary or secondary aliphatic or alicyclic amine having an active, free hydrogen on the amino group. Such amines include alkyl amines, cycloalkyl amines, unsaturated amines such as allyl amine, heterocyclic amines, and amines having various substituents as discussed earlier. The following amines are typical of those useful in the process of this invention and from which the group —NZ in the unsaturated amine is derived by removal of a free amino hydrogen therefrom via said reaction.

$$CH_3NH_2$$

$$CH_3(CH_2)_nNH_2$$

$n=1$ to 18

$$\begin{array}{c} CH_3 \\ \diagdown \\ \quad CHNH_2 \\ \diagup \\ CH_3 \end{array}$$

$$\begin{array}{c} CH_3 \\ \diagdown \\ \quad CHCH_2NH_2 \\ \diagup \\ CH_3 \end{array}$$

$$(CH_3)_2NH$$

$$CH_3NH(CH_2)_nCH_3$$

$n=1$ to 14

$$(C_2H_5)_2NH$$

$$C_2H_5NHCH_3$$

$$C_2H_5NH(CH_2)_nCH_3$$

$n=1$ to 14

$$(CH_3)_2NCH_2CH_2CH_2NH_2$$

$$CH_3NHCH_2CH_2CH_2NH_2$$

$$\begin{array}{c} CH_3CHCH_3 \\ | \\ NH_2 \end{array}$$

$$\begin{array}{c} CH_3CH(CH_2)_nCH_3 \\ | \\ NH_2 \end{array}$$

$n=1$ to 12

$$CH_2=CHCH_2NH_2$$

$$\left[ \begin{array}{c} CH_3 \\ \diagdown \\ \quad CHCH_2 \\ \diagup \\ CH_3 \end{array} \right]_2 NH$$

$$HOCH_2CH_2NH_2$$

$$\begin{array}{c} HOCH_2CH_2NH \\ | \\ C_2H_5 \end{array}$$

$$HOCH_2CH_2CH_2NH_2$$

$$HOCH_2CH_2OCH_2CH_2NH_2$$

$$C_6H_5CH_2NH_2$$

$$C_2H_5OCH_2CH_2NH_2$$

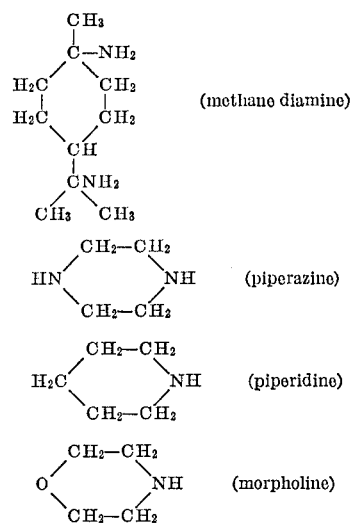

(methane diamine)

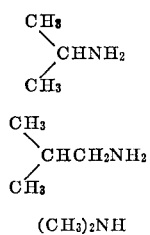 (piperazine)

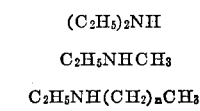 (piperidine)

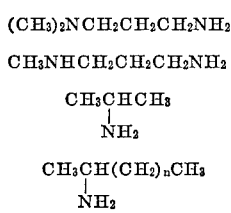 (morpholine)

Thus, according to this invention a fluoroalkyl ethylene having terminal unsaturation is reacted with a primary or secondary amine to provide an unsaturated fluoroalkyl amine having beta-gamma ethylenic unsaturation. This shift of the unsaturated bond gives rise to the unique class of unsaturated amines embodied herein. The preferred amines of this invention are represented by the following:

$$(CF_3)_2CF(CF_2)_mCF=CHCH_2\overset{H}{N}(CH_2)_nCH_3$$

$m=0$ to 12,
$n=0$ to 14

$$(CF_3)_2CF(CF)_{2m}CF=CHCH_2\overset{H}{N}CH_2CH_2OH$$

$m=0$ to 12

$$(CF_2)_2CF(CF_2)_mCF=CHCH_2NCH_2CH_2OH$$
$$\quad\quad\quad\quad\quad\quad\quad\quad\quad\quad\quad\quad | \quad\quad\quad$$
$$\quad\quad\quad\quad\quad\quad\quad\quad\quad\quad\quad\quad C_2H_5$$

$m=0$ to 12

$$(CF_3)_2CF(CF_2)_mCF=CHCH_2NHC_2H_4OC_2H_4OH$$

$m=0$ to 12

The reaction of this invention is carried out at temperatures within the range of about 0° to about 250° C., preferably at from about 50° to 150° C. It is desirable to employ an excess of the amine reactant not only for obvious economic reasons, but also to minimize, when the amine reactant is represented by $H_2NR_1$, subsequent reaction of the product $R_fR'_fC=CHCH_2NHR_1$ with additional olefin. In general, it is advantageous to contact from at least about 2 to about 20 moles of amine per mole of fluoroalkyl ethylene in carrying out the reaction. The reaction is normally carried out at autogeneous pressure for from about 1 to about 24 hours to obtain yields, based on fluoroalkyl ethylene charged, on the order of from about 40% to essentially stoichiometric. The by-product of the reaction, a water-soluble amine hydrofluoride, is removed from the crude reaction mixture by a water wash. The unsaturated fluoroalkyl amine is then dried and purified, if so desired, by fractional distillation at reduced pressure.

The present invention provides, as mentioned earlier, unique beta-gamma unsaturated fluoroalkyl amines having the formulae $R_fR'_fC=CHCH_2NZ$, where —NZ is a primary or secondary amine minus an amino hydrogen atom. U.S. Pat. No. 2,808,425, Oct. 1, 1957, to R. N. Haszeldine, discloses alpha-beta unsaturated fluoroalkyl enamines of the formula $R_fCH=CHNR'R''$ where $R_f$ is perfluoroalkyl, and $R'$ and $R''$ are hydrogen or alkyl, not more than one of which is hydrogen. This previously known class of amines is prepared by reacting a perfluoroalkyl substituted acetylene with an amine, as follows:

$$R_fC\equiv CH+HNR'R'' \rightarrow R_fCH=CHNR'R''$$

In addition to the markedly different method of preparing the beta-gamma unsaturated amines of the present invention from the method of Haszeldine (U.S. 2,808,425) in preparing his alpha-beta unsaturated amines, there are important differences in properties and reactivities of the two classes of amines. This difference is due to the relative position of the double bond (i.e. allylic vs. vinylic). Furthermore, the prior art vinylic amines (i.e., enamines) have the structure

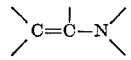

and undergo enamine type activation, viz.

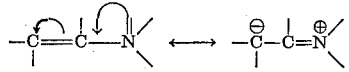

In contrast, the amines of the present invention have the structure

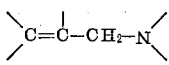

and cannot exhibit this type of reactivity. Consequently, as discussed hereinbelow, the amines of the present invention having the formula $R_fR'_fC=CHCH_2NHR$ can be reacted with methacrylyl chloride or an aromatic diisocyanate to form, respectively, a methacrylate ester or urethane resin precursor through a condensation reaction involving the active amino hydrogen atom. There is no attack and addition of the aforesaid reactants at the beta-gamma double bond of the amine, leaving this site available for cross-linking (curing) in polymers derived from said methacrylate ester or urethane resin precursor. On the other hand, the very aoctive alpha-beta double bond of the prior art vinylic amines, $$R_fCH=CHNHR'$$

reacts with both methacrylyl chloride and a diisocyanate to form undesirable reaction products. Moreover, such enamines are not very stable to storage even at room temperature because they tend to hydrolyze, oxidize, polymerize or revert to their precursors. They are, therefore normally used immediately after preparation for further synthetic transformations. The amines of this invention are, in contrast, stable indefinitely under ambient storage conditions.

Their invention also provides new unsaturated fluoroalkyl ammonium salts of the formula

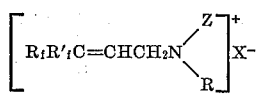

where X is an anion and

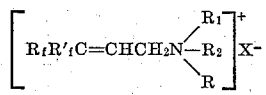

when —NZ is represented by

For example, quaternary ammonium halide derivatives are prepared from the unsaturated amines via reaction with a hydrocarbon halide quaternizing agent, RX, where R is lower alkyl, viz.

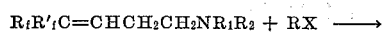

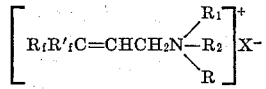

The above-depicted quaternizing reaction is conveniently carried out at moderate temperatures, for example, from about 20° C. to 50° C., in a solvent such as diethyl ether or ethanol or a mixture thereof. The preferred quaternizing agent is methyl iodide. The fluorocarbon quaternary ammonium products are effective cationic surface active agents both in water systems and in oil and wax systems, giving a high degree of surface tension reduction at concentrations as low as 0.1% by weight or less. These cationic fluoroalkyl surfactants are more soluble in acid media than in alkaline media. They are of special value, therefore, in the formulation of phosphoric-hydrochloric acid type cleaning solutions used on concrete and metals. In acidic, metal descaling, pickling, and etching baths, these compounds serve as both wetting agent and corrosion inhibitor. These surfactants are also useful as corrosion inhibitors and leveling agents for aqueous wax and/or resin emulsions that are widely used in the form of the so-called "self-polishing" wax formulations which dry to a shine without buffing. Modern "heavy-duty" floor waxes are often formulated with resins that are insoluble in alkaline cleaning compositions, e.g. soaps and detergents, although the resins are easily solubilized by acidic cleaners. The cationic, alkaline-insoluble, fluoroalkyl surfactants of this invention are ideally suited for such formulations, improving the leveling, gloss and wetting power while minimizing streaking.

In like manner, this invention also provides a new class of unsaturated fluoroalkyl ammonium salts of the formula

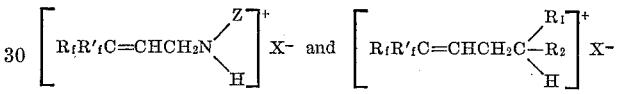

when —NZ is represented by —NR₁R₂, via the reaction of the unsaturated amine with an acid or the anion X, for example, hydrochloric acid, sulfuric acid, phosphoric acid, acetic acid, etc., viz.

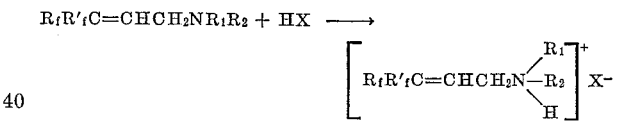

The reaction is easily carried out at room temperature in diethyl ether-ethanol solvent. The aforementioned adducts, the HCl adduct being preferred, are also very effective cationic surfactants, particularly in aqueous systems. They are also useful as leveling agents in wax formulations and for forming stable water-in-hydrocarbon emulsions.

An important use of the unsaturated fluoroalkyl amine of this invention as an intermediate in the preparation of polymers for treating textile and leather to impart oil and water repellency thereto. For example, the amine is reacted with methacrylyl chloride to produce the methacrylate monomer derivative according to the reaction:

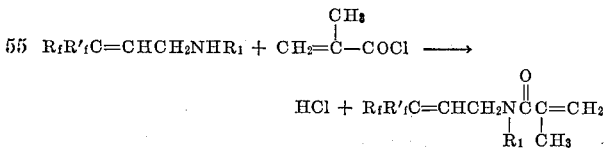

The methacrylate monomer is subsequently polymerized using conventional aqueous emulsion polymerization techniques to provide a polymer latex suitable for textile treatment to provide oil and water repellency. Because of the presence of two olefinic bonds in the methacrylate monomer, the polymer derived therefrom has sites available for cross-linking. From about 0.01% to 5% of a substance that promotes cross-linking, for instance, a peroxide or metal salt, may be added to the latex. The latex is applied to the textile material and the subsequent drying and curing of the coating at elevated temperatures results in a cross-linked surface treatment that has increased washfastness, hardness, abrasion resistance, and resistance to ultraviolet light.

Resinous materials useful for imparting oil and water repellency to leather are prepared by reacting a fluoroalkyl amine of this invention. $R_fR'_fC=CHCH_2NHR_1$, with the reaction product of an alcohol and aromatic diisocyanate, preferably in such stoichiometric amounts that the molar equivalents of the diisocyanate in the reaction mixture equals the total of the equivalents of the alcohol and amine combined.

The examples that follow are set forth to clarify and illustrate the invention and are not to be construed as limiting the scope thereof. Examples 1–13 are illustrative of preparation of the unsaturated fluoroalkyl amines and derivatives of this invention, and Examples 14–17 are illustrative of the utilization of the novel amine in the preparation of textile and leather treating compositions. The chemical structures of the new compounds prepared in the examples were determined by the standard techniques of elemental analyses, infrared and mass spectroscopy, and nuclear magnetic resonance.

EXAMPLE 1

0.1 mole of a fluoroalkyl ethylene of the formula $(CF_3)_2CF(CF_2)_6CH=CH_2$ is reacted with 2 moles methylamine ($CH_3NH_2$) with stirring at 60° to 72° C. for four hours in a stainless steel autoclave at a pressure of about 100 to 110 p.s.i.g. The reactor is cooled and vented, and the crude product, after several water washes, is comprised of about 3% of unreacted starting fluoroalkyl ethylene and mainly the unsaturated amine $$(CF_3)_2CF(CF_2)_5CF=CHCH_2NHCH_3$$

infrared C=C band at 5.87μ, N—H band at 3.05μ, B.P. 104–105° C. at 20 mm. Hg, $n_D^{25}$ 1.3341. Analysis: C, 28.72; H, 160; F, 67.30; N, 2.82%. Molecular weight, 508 (neutral equivalent), 506±2 (mass spectrum). Calculated for $C_{12}H_7F_{18}N$: C, 28.42; H, 1.39; F, 67.43; N, 2.76%. Molecular weight, 507.

The above reaction is repeated except that it is carried out at 25° C. for two hours. Sixty percent of the fluoroalkyl ethylene is converted to a product which consists essentially of the unsaturated amine $$(CF_3)_2CF(CF_2)_5CF=CHCH_2NHCH_3$$

The above procedure is carried out again with 0.2 mole of the fluoroalkyl ethylene and 2 moles of methylamine reacted at 80° C. and 175 p.s.i.g. for four hours. The crude product is washed with water, dried with anhydrous $MgSO_4$ and distilled to yield 0.11 mole of the unsaturated amine $(CF_3)_2CF(CF_2)_5CF=CHCH_2NHCH_3$.

In another run of the same reaction, 0.3 mole of the fluoroalkyl ethylene is reacted with 2.3 moles of $CH_3NH_2$ at 60° C. and 100 p.s.i.g. for five hours. Work-up of the product as in the previous run yields 0.25 mole of $$(CF_3)_2(CF_2)_5CF=CHCH_2NHCH_3$$

In addition, there is produced a small amount (.002 mol) of the tertiary amine, $$[(CF_3)_2CF(CF_2)_5CF=CHCH_2]_2NCH_3$$

infrared C=C band 5.85μ, no sign of N—H band in the 3.0–3.2μ region.

EXAMPLE 2

The fluoroalkyl ethylene $(CF_3)_2CF(CF_2)_6CH=CH_2$ (0.11 mole) is reacted at 25° C. for twenty-four hours with 0.10 mole of n-butylamine. The crude reaction mixture, a solid crystalline mass, is mixed with water. A water-immiscible layer separates and is found to be essentially pure unsaturated amine

infrared C=C band at 5.85μ, N—H band at 3.05μ, $n_D^{25}$ 1.3471. Analysis: C, 33.00; H, 2.60; F, 62.06; N, 2.74%. Molecular weight, 553 (neutral equivalent), 548±2 (mass spectrum). Calculated for $C_{15}H_{13}F_{18}N$: C, 32.80; H, 2.39; F, 62.26; N, 2.55%. Molecular weight, 549.

EXAMPLE 3

The fluoroalkyl ethylene $(CF_3)_2CF(CF_2)_6CH=CH_2$ (0.006 mole) is reacted with 0.08 mole of sec.-butyl amine for several days at about 100° C. to produce the unsaturated amine (isolated from the crude product by chromatographic trapping),

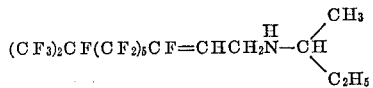

infrared C=C band 5.81μ; N—H band 3.05μ, $n_D^{25}$ 1.3468. Analysis: C, 32.97; H, 2.67; F, 62.12; N, 2.38%. Molecular weight, 549±1 (mass spectrum). Calculated for $C_{15}H_{13}F_{18}N$: C, 32.80; H, 2.39; F, 62.26; N, 2.55%. Molecular weight, 549.

EXAMPLE 4

$C_8F_{17}CF_2CH=CH_2$ (0.4 mole) and N-methylethanolamine (0.8 mole are charged to a flask equipped with a stirrer and reflux condenser. The reaction is carried out for three hours at 130–140° C., whereupon the mixture is cooled to room temperature and mixed with about five times its volume of water to form a gelatinous mass which is then extracted with $CCl_2FCClF_2$, which solvent is then evaporated to leave a residue that is fractionally distilled to yield 0.276 mole of unsaturated amine

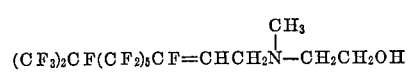

infrared C=C band 5.8μ, B.P. 85° C. at ca. 0.01 mm. Hg. Analysis: C, 30.69; H, 2.28; N, 2.41%. Calculated for $C_{14}H_{11}F_{18}NO$: C, 31.59; H, 2.08; N, 2.63%.

EXAMPLE 5

A mixture of $C_8F_{17}CF_2CH=CH_2$ (0.06 mole) and ethanolamine (0.3 mole) is stirred at reflux (125° C.) for 8.5 hours. The cooled reaction product is washed with water, and the water-swollen gel remaining after draining off the water is extracted with diethyl ether. The ether is evaporated and the residue fractionally distilled to yield 0.03 mole of the fluoroalkyl amine.

$$C_8F_{17}=CHCH_2NHCH_2CH_2OH$$

infared C=C 5.8μ, B.P. 95° C. at ca. 0.01 mm. Hg. Analysis: C, 29.10; H, 2.04; N, 2.63%; Calculated for $C_{13}H_9F_{18}NO$: C, 29.06; H, 1.68; N, 2.60%.

EXAMPLE 6

A mixture of 496.0 g. (1.0 mole) of $C_9F_{19}CH=CH_2$ and 515 g. (5.0 mole) of $H_2NC_2H_4OC_2H_4OH$ is treated to 130–150° C. and stirred vigorously for 7 hours. The crude product is taken up in 750 ml. ether and washed with 600 ml. $H_2O$. The ether is evaporated in a steam bath and the residue fractionally distilled. The fraction B.P. 118–122°/ca. 0.1 mm. is $$C_8F_{17}CF=CH-CH_2NHCH_2H_4OC_2H_4OH$$

25% yield. Analysis: Calculated for $C_{15}F_{18}H_{13}NO_2$: C, 31.00; H, 2.24; N, 2.41; F, 58.85%. Found C, 30.72; H, 2.53; N, 2.28; F, 59.74%.

EXAMPLE 7

A mixture of 6 parts by weight of $C_8F_{17}CF_2CH=CH_2$ and 7 parts of benzylamine is heated in a steam bath for several days. The product, isolated by gas chromatographic trapping, is analyzed and shown to be

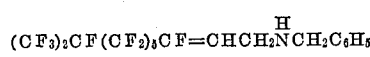

EXAMPLE 8

One mole of $C_8F_{17}CF_2CH=CH_2$ is reacted with 3 moles of dimethyl amine for several hours at 100° C. in a steel cylinder to yield the unsaturated amine $$(CF_3)_2CF(CF_2)_5CF=CHCH_2N(CH_3)_2$$

infrared C=C band, 5.86μ; $n_D^{25}$ 1.3348. Analysis: C, 29.93; H, 1.88; F. 65.30; N, 2.42%. Molecular weight, 521±1 (mass spectrum). Calculated for $C_{13}H_9F_{18}N$: C, 29.96; H, 1.74; F, 65.61; N, 2.69%. Molecular weight 521.

EXAMPLE 9

A mixture of 0.1 mole of diisopropylamine and 0.01 mole of $C_8F_{17}CF_2CH=CH_2$ is heated on a steam bath for several days to yield $$(CF_3)_2CF(CF_2)_5CF=CHCH_2N[CH(CH_3)_2]_2$$

EXAMPLE 10

$C_8F_{17}CF_2CH=CH_2$ (0.1 mole) is reacted with 1 mole of ethylene diamine ($H_2NCH_2CH_2NH_2$) at 100° C. for several hours to yield the products

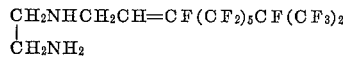

and

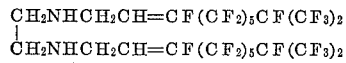

EXAMPLE 11

$C_8F_{17}CF_2=CH_2$ (0.05 mole) is reacted with 0.5 mole of menthane diamine at 100° C. for several days to yield the products

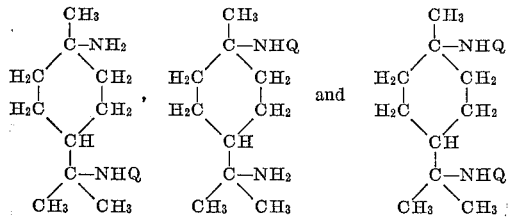

where Q represents —$CH_2CH=CF(CF_2)_5CF(CF_3)_2$

EXAMPLE 12

15.2 parts of the unsaturated fluoroalkyl amine prepared in Example 1 is dissolved in a mixture of 70 parts diethyl ether and 80 parts ethanol. A slight excess of anhydrous HCl is passed through the solution producing a clear gelatinous mass which is separated from the solvent on a sintered glass filter and washed several times with ethanol. The white waxy product is dried on a steam bath and finally in an air oven to give 11.9 parts of a free flowing solid having the formula

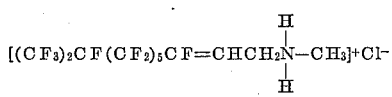

M.P. 182–183° C. A 0.1% aqueous solution of this surfactant has a surface tension of 21.8 dynes cm.$^{-1}$ and a 1% solution has surface tension of 16 dynes cm.$^{-1}$.

In a similar manner, the HBr and HI adducts of the unsaturated fluoroalkyl amine are prepared and also found to be excellent cationic surfactants.

EXAMPLE 13

One mole of the unsaturated fluoroalkyl amine prepared in Example 8 is dissolved in ethyl ether, mixed with two moles of methyl iodide and left standing overnight. The ether is evaporated leaving the quaternary ammonium iodide salt of the formula

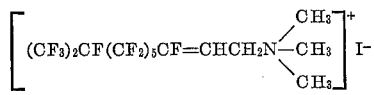

This product is also an excellent cationic surfactant.

EXAMPLE 14

A 50 ml. resin flask is charged with 11.6 grams (0.04 equivalent) of alcoholized dehydrated castor oil and 5.8 grams (0.067 equiv.) of 2,4-toluene diisocyanate. The mixture is heated from 25° C. up to 80° C. during a period of about three hours and then 0.14 gram of triethylene diamine is added thereto, followed 15 minutes later by the addition of 12.7 grams (0.025 equiv.) of the unsaturated amine $$(CF_3)_2CF(CF_2)_5CF=CHCH_2NHCH_3$$

The temperature is increased to 108° C., at which temperature the fluid mixture is held for 2.5 hours, and then poured into a dish. The product solidifies upon cooling to form a solid, brittle resin.

An 0.8% solution of the above-prepared resin in $CH_3CCl_3$, containing as a drier 0.1% Zr, 0.05% Co and 0.05% Ca naphthenate salts, is used to spray a swatch of pigskin suede leather. The swatch is dried for a few minutes under a heat lamp and then at room temperature for twenty-four hours. The leather is tested for oil and water repellency characteristics using the techniques described in U.S. Pat. No. 3,304,278, Feb. 14, 1967, M. Hauptschein and S. S. Toukan. The results are an oil repellency rating of 110 and a water repellency rating of 80.

EXAMPLE 15

A 50 ml. resin flask is charged with 10.8 g. (0.040 equiv.) octadecyl alcohol and 5.8 g. (0.067 equiv.) 2,4-toluene diisocyanate is added dropwise with stirring during 10 min. at 60–70° C. The reaction mixture is heated 2 hours at 70° C. and then heated to 80° C. at which time 0.14 g. triethylene diamine is added. About 10 minutes later 12.1 g. (0.025 eq.) of $C_8F_{17}CF=CHCH_2NHCH_3$ is added and the temperature raised to 104° C. and maintained for 3 hours. The hot fluid resin is poured into a casting dish where it cools at room temperature to form a hard solid. A 0.08% solution of the resin in $CH_3CCl_3$ is applied to pigskin suede leather. The dried leather has an oil repellency rating of 70 and a water repellency rating of 70.

EXAMPLE 16

A flask, equipped with stirrer, condenser and addition funnel, is charged with about 18 parts diethyl ether, 10 parts (0.018 mole) of the unsaturated amine produced in Example 4, i.e.,

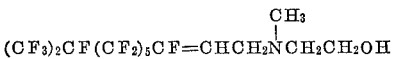

1.9 parts (0.019 mole) of triethylamine and a trace amount of hydroquinone. Methacryloyl chloride (2.1 parts, 0.02 mol) is added dropwise and the mixture held at the reflux temperature for 3 hours, then cooled and filtered. The filtrate is washed with 10% aqueous NaOH and then water. The solvent is stripped off and the product is fractionally distilled to give the colorless liquid product, a methacrylate derivative of the formula

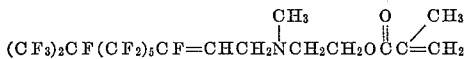

B.P. 102° C. at ca. 0.01 mm. Hg. Analysis: C, 35.46; H, 2.70; N, 2.32%. Calculated for $C_{18}H_{15}F_{18}NO_2$: C, 34.90; H, 2.44; N, 2.26%.

The above prepared methacrylate monomer is polymerized in aqueous emulsion using the following recipe:

| Ingredient: | Parts by weight |
|---|---|
| Methacrylate monomer | 2.5 |
| 60% aqueous N-methylolacrylamide | 0.1 |
| Acetone | 1.6 |
| Water | 7.5 |
| Cetyltrimethylammonium bromide | 0.12 |
| 2,2'-azodiisobutyramidine dihydrochloride | 0.05 |

The polymerization is carried out for three hours at 70° C. with gentle agitation to produce a coagulum-free latex.

Twenty parts of this latex is mixed with 80 parts of a latex prepared from the above recipe using decyl methacrylate as the methacrylate monomer. The latex mixture is applied to 80 x 80 cotton at 1% add-on and dried three minutes at 105–100° C. and for three minutes at 170° C. The treated fabric has an oil repellency rating of 80 and a water repellency of 50.

EXAMPLE 17

15.4 parts (0.152 mole) of triethylamine and 77 parts (0.152 mole) of the amine $$(CF_3)_2CF(CF_2)_5CF=CHCH_2NHCH_3$$

are charged to 700 parts diethyl ether solvent. 15.9 parts (0.152 mole) of methacrylyl chloride is added to the mixture dropwise over a one-hour period. The mixture is heated and held at reflux temperature for two hours, and then cooled and filtered. The ether solution is successively washed with water, 5% HCl solution, water, 5% NaHCO$_3$ solution, and water. The ether is evaporated and the product residue (0.14 mole) is fractionally distilled and shown to be

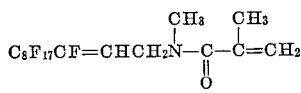

B.P. 100° C. at 0.01 mm. Hg. Analysis: C, 33.41; H, 2.17; F, 59.50; N, 2.52%. Calculated for C$_{16}$H$_{11}$F$_{18}$NO: C, 33.40; H, 2.43; F, 59.45; N, 2.43%.

This methacrylate monomer is useful, as in the preceding example, in preparing copolymeric latexes which, when applied to cellulosic fabrics and heat-cured, provides an excellent oil and water repellent coating.

We claim:

1. A beta-gamma unsaturated fluoroalkyl amine represented by the formula R$_f$R'$_f$C=CHCH$_2$NZ where R$_f$ and R'$_f$ are independently selected from the group consisting of fluorine, perfluoroalkyl, perfluorochloroalkyl, perfluorohydroalkyl and perflorochlorohydroalkyl, R$_f$ and R'$_f$ taken tgether having up to about 20 carbon atoms, NZ is the residue of an amine obtained by removal of a free amino hydrogen atom from an amine selected from the group consisting of primary and secondary alkyl and monoalkanol amines having up to about 20 carbon atoms, allyl amine, benzyl amine, 2-amino diethyl ether, 2-amino-2'-hydroxy diethyl ether and menthane diamine.

2. The compounds of claim 1 wherein R$_f$ is perfluoroalkyl having from 6 to 14 carbon atoms and R'$_f$ is fluorine.

3. An unsaturated amine in accordance with claim 1 where R$_f$ is (CF$_3$)$_2$CF(CF$_2$)$_5$ and R'$_f$ is fluorine.

4. An unsaturated amine in accordance with claim 3 wherein NZ is

5. An unsaturated amine in accordance with claim 3 wherein NZ is

6. An unsaturated amine in accordance with claim 3 wherein NZ is

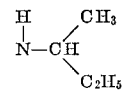

7. An unsaturated amine in accordance with claim 3 wherein NZ is

8. An unsaturated amine in accordance with claim 3 wherein NZ is

9. An unsaturated amine in accordance with claim 3 wherein NZ is

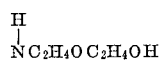

10. An unsaturated amine in accordance with claim 3 wherein NZ is

11. An unsaturated amine in accordance with claim 3 wherein NZ is N(CH$_3$)$_2$.

12. An unsaturated amine in accordance with claim 3 wherein NZ is N[CH(CH$_3$)$_2$]$_2$.

13. A method of preparing a beta-gamma unsaturated fluoroalkyl amine represented by the formula $$R_fR'_fC=CHCH_2NZ$$

which comprises reacting an amine selected from the group consisting of primary and secondary alkyl and monoalkanol amines having up to about 20 carbon atoms, allyl amine, benzyl amine, 2-amino diethyl ether, 2-amino-2'-hydroxy diethyl ether and menthane diamine with a fluoroalkyl ethylene of the formula R$_f$R'$_f$CFCH=CH$_2$ where R$_f$ and R'$_f$ are independently selected from the group consisting of fluorine, perfluoroalkyl, perfluorochloroalkyl, perfluorohydroalkyl and perfluorochlorohydroalkyl, and NZ is the residue of an amine obtained by removal of a free amino hydrogen atom from an amine reactant as set forth above.

References Cited

UNITED STATES PATENTS 2,501,509  3/1950  Gresham et al.
2,808,425  10/1957  Haszeldine.

CHARLES B. PARKER, Primary Examiner

R. L. RAYMOND, Assistant Examiner

U.S. Cl. X.R.

8—9413; 252—8.8, 137, 152; 260—247, 268, 293, 501.1, 501.15, 501.17, 561, 562, 563, 567.6, 583, 584, 585